J. C. Young
Harness Saddle,
Nº 52,924. Patented Feb. 27, 1866.
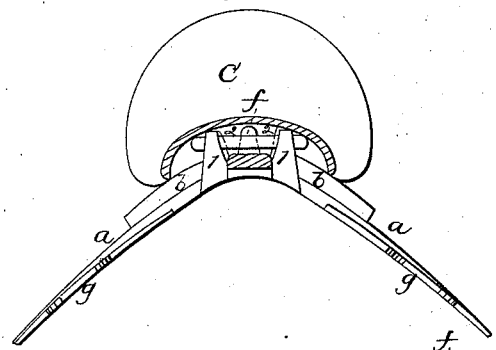
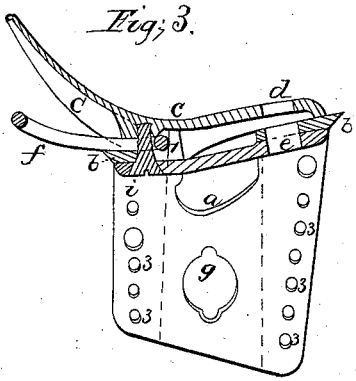
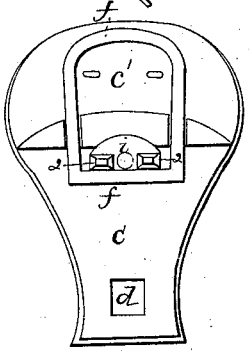
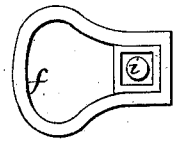
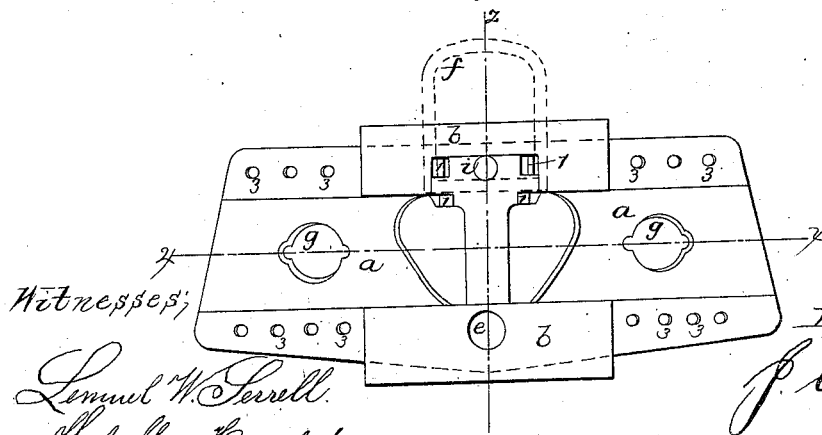
Witnesses:
Lemuel W. Serrell
Chs. Geo. Harold
Inventor:
J. C. Young

UNITED STATES PATENT OFFICE.

JOHN C. YOUNG, OF NEWARK, NEW JERSEY.

IMPROVED CRUPPER-LOOP FOR SADDLE-TREES.

Specification forming part of Letters Patent No. 52,924, dated February 27, 1866.

*To all whom it may concern:*

Be it known that I, JOHN C. YOUNG, of Newark, in the county of Essex and State of New Jersey, have invented, made, and applied to use a certain new and useful Improvement in Saddle-Trees for Harness; and I do hereby declare the following to be a full, clear, and exact description of the said invention, reference being had to the annexed drawings, making part of this specification, wherein—

Figure 1 is a plan of the tree with the seat-piece removed. Fig. 2 is a section at the line $x\,x$ of Fig. 1, and Fig. 3 is a section at the line $z\,z$ of Fig. 1, and Fig. 4 is the seat-piece inverted.

Similar marks of reference denote the same parts.

My said invention relates to a mode of attaching a separate and removable crupper-loop between the tree and movable seat-piece by means of lugs or projections on the seat or tree, or both, around which said crupper-loop sets, and the parts are secured by a screw passing into the seat. By this means I am able to replace a crupper-loop if broken, and the crupper can be attached to the loop, if desired, when separate from the saddle. By this mode of fitting the crupper-loop only a ring or open frame is required, that can easily be obtained in case of the crupper-loop being broken or lost, as the screw that is employed enters the seat and does not screw into the loop, as has sometimes before been the case.

In the drawings, $a$ is the metallic saddle-tree, formed with ribs on its sides, so that a groove is formed in it, leaving a recess for the back-band to pass in from side to side across the saddle. $b\,b$ are pieces of leather or similar material, known as "gullet-pieces," that are secured upon the tree $a$ on each side of the recess receiving the back-band, and said pieces may be attached by tacks introduced through holes in the metallic tree. $c$ is the seat-piece, formed with a wooden or similar block at $c'$, to which the leather or other covering of the saddle-tree is secured by nailing or otherwise. $d$ is a hole in $c$, and $e$ a hole in $a$, through which the shank or bolt of the check-rein hook passes, and $i$ is a screw-bolt, connecting $a$ and $c$ together at the rear part, said screw $i$ passing behind the back-band, so as not to injure the same by passing through it.

Upon the tree $a$ lugs 1 1 are formed, between which the crupper-loop $f$ passes, and said loop is formed of the shape represented in Figs. 1 and 4, or it may be formed in the shape shown in Fig. 5. In either instance the loop, setting over the lug and to the back thereof, cannot escape, because the saddle or seat piece $c$ holds it in place; and, if desired, lugs, as at 2 2, may also project downward from the under side of the seat-piece, to aid in holding the crupper-loop.

The openings at $g\,g$ are for the nuts of the terrets, and the holes 3 3 are for nails or rivets, securing the upper ends of the flaps in the usual manner.

It will now be understood that the back-band passes entirely across the saddle-tree in the groove left for it, and hence that the weight of the shafts and strain on the back-band do not tend (as now usual with separate pieces attached to the tree) to loosen and draw said back-band away from the tree, and the shanks of the terrets passing into holes in said back-band only act to prevent the back-band sliding on the saddle.

What I claim, and desire to secure by Letters Patent, is—

Forming the crupper-loop as a ring or open frame, in combination with lugs on the tree or seat-piece, as set forth, the saddle and tree being united directly to each other by a screw and retaining the crupper-loop between them, as specified.

In testimony whereof I have hereunto set my signature this 18th day of July, 1864.

J. C. YOUNG.

Witnesses:
   LEMUEL W. SERRELL,
   THOS. GEO. HAROLD.